United States Patent
Hamm et al.

(10) Patent No.: US 11,650,605 B1
(45) Date of Patent: May 16, 2023

(54) COMBINATION VALVE FOR PRESSURE BUILDING AND FINAL-LINE GAS REGULATION

(71) Applicant: Engineered Controls International, LLC, Elon, NC (US)

(72) Inventors: Mark Kendrick Hamm, Cullman, AL (US); John Grenaway, Huntersville, NC (US)

(73) Assignee: Engineered Controls International, LLC, Elon, NC (US)

( * ) Notice: Subject to any disclaimer, the term of this patent is extended or adjusted under 35 U.S.C. 154(b) by 70 days.

(21) Appl. No.: 17/304,302

(22) Filed: Jun. 17, 2021

Related U.S. Application Data

(60) Provisional application No. 63/040,848, filed on Jun. 18, 2020.

(51) Int. Cl.
*G05D 7/03* (2006.01)

(52) U.S. Cl.
CPC .................... *G05D 7/03* (2013.01)

(58) Field of Classification Search
CPC ........ G05D 7/03; G05D 16/10; G05D 16/101; G05D 16/063; G05D 16/08; G05D 16/0663; G05D 16/0672; F17C 13/04; F17C 2205/0338; F17C 2223/0146; F17C 2250/0626
See application file for complete search history.

(56) References Cited

U.S. PATENT DOCUMENTS

| | | | | | |
|---|---|---|---|---|---|
| 2,197,144 | A | * | 4/1940 | Carnes | F17C 13/045 137/607 |
| 4,944,324 | A | * | 7/1990 | Kajino | F17C 13/045 137/550 |
| 5,136,852 | A | * | 8/1992 | Neeser | F17C 13/025 62/51.1 |

* cited by examiner

*Primary Examiner* — Michael R Reid
(74) *Attorney, Agent, or Firm* — Neal, Gerber & Eisenberg LLP

(57) ABSTRACT

A combination valve for pressure building and final-line gas regulation is disclosed. An example valve includes a body defining a first tank port and a second tank port, an outlet port, and a linking chamber fluidly connected to the second tank port. The valve includes a first piston diaphragm at least partially defining a first pressure cavity fluidly connected to the first tank port and a first plug operatively connected to the first piston diaphragm. The first pressure cavity is fluidly connected to the linking chamber when the first plug is in an open position. The valve includes a second piston diaphragm at least partially defining a second pressure cavity fluidly connected to the outlet port and a second plug operatively connected to the second piston diaphragm. The second pressure cavity is fluidly connected to the linking chamber when the second plug is in an open position.

21 Claims, 10 Drawing Sheets

COMBINATION VALVE FOR PRESSURE BUILDING AND FINAL-LINE GAS REGULATION

CROSS-REFERENCE

This application claims priority to U.S. Provisional Patent Application No. 63/040,848, filed on Jun. 18, 2020, the contents of which are incorporated herein by reference in their entirety.

TECHNICAL FIELD

The present disclosure generally relates to valves and, more specifically, to a combination valve for pressure building and final-line gas regulation.

BACKGROUND

Carbon dioxide ($CO_2$) cylinders are used to provide carbonation to carbonated beverages. For instance, $CO_2$ cylinders are used to provide carbonation to carbonated beverages that are dispensed to customer and/or food provider via a beverage dispensing machine.

Oftentimes, a pressure build regulator also is used to facilitate the $CO_2$ cylinder in providing the carbonation. For instance, a pressure build regulator may take liquid $CO_2$ from the bottom of the $CO_2$ cylinder, vaporize it, and supply expanded $CO_2$ gas to the top of the $CO_2$ cylinder to build and maintain the pressure of the $CO_2$ that is provided for carbonation. Additionally, a final-line gas regulator may be used to control the pressure of the $CO_2$ gas that is taken from the $CO_2$ cylinder to carbonate the beverage dispensed by the beverage dispensing machine.

Implementing both a pressure build regulator and a final-line gas regulator oftentimes results in pipe connections, fittings, and isolation valves. For instance, one set of connections, fittings, and valves may be required for connecting the pressure build regulator to the $CO_2$ cylinder and the beverage dispensing machine and another set of connections, fittings, and valves may be required for connecting the final-line gas regulator to the $CO_2$ cylinder and the beverage dispensing machine. Such a configuration may result in a large number of parts to be installed and serviced and/or a large number of potential leak points.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for a combination valve for pressure building and final-line gas regulation. An example disclosed valve for providing pressurized fluid to a pressurized-fluid consuming device includes a body that defines a body defining a first tank port and a second tank port configured to fluidly connect to a pressurized tank, an outlet port configured to fluidly-connect to a pressurized-fluid consuming device, and a linking chamber fluidly connected to the second tank port. The example disclosed valve also includes a pressure-build assembly that includes a first bonnet coupled to the body, a first piston diaphragm at least partially defining a first fluid-pressure chamber that is fluidly connected to the first tank port, a first valve seat, and a first plug operatively connected to the first piston diaphragm and configured to selectively engage the first valve seat in a first closed position. The first fluid-pressure chamber is fluidly connected to the linking chamber when the first plug is disengaged from the first valve seat in a first open position. The example disclosed valve also includes a final-line assembly that includes a second bonnet coupled to the body, a second piston diaphragm at least partially defining a second fluid-pressure chamber that is fluidly connected to the outlet port, a second valve seat, and a second plug operatively connected to the second piston diaphragm and configured to selectively engage the second valve seat in a second closed position. The second fluid-pressure chamber is fluidly connected to the linking chamber when the second plug is disengaged from the second valve seat in a second open position.

In some examples, to increase a pressure of the pressurized fluid within the pressurized tank, the first tank port is fluidly connected to a lower portion of the pressurized tank to receive the pressurized fluid in liquid form and the second tank port is fluidly connected to an upper portion of the pressurized tank to provide the pressurized tank with the pressurized fluid in gas form upon vaporization. In some such examples, the second tank port is fluidly connected to the first tank port via the first fluid-pressure chamber and the linking chamber when the first plug is disengaged from the first valve seat in the first open position.

Further, in some such examples, the first plug is configured to be in the first open position when the pressure of the pressurized fluid within the first fluid-pressure chamber is less than a first pressure threshold. Moreover, in some such examples, the first plug is configured to be in the first closed position to fluid disconnect the first and second tank ports when the pressure of the pressurized fluid within the first fluid-pressure chamber is greater than or equal to the first pressure threshold. Moreover, in some such examples, when the first tank port is fluidly connected to the pressurized tank, the pressure of the pressurized fluid within the first fluid-pressure chamber equals the pressure of the pressurized fluid within the pressurized tank.

Further, in some such examples, the second plug is configured to be in the second open position when the pressure of the pressurized fluid within the second fluid-pressure chamber is less than a second pressure threshold. Moreover, in some such examples, to limit the pressure of the pressurized fluid that is provided to the pressurized-fluid consuming device, the second plug is configured to be in the second closed position to fluid disconnect the second tank port and the outlet port when the pressure of the pressurized fluid within the second fluid-pressure chamber is greater than or equal to a first pressure threshold. Additionally, in some such examples, when the outlet port is fluidly connected to the pressurized-fluid consuming device, the pressure of the pressurized fluid within the second fluid-pressure chamber equals the pressure of the pressurized fluid within the pressurized-fluid consuming device.

Some examples further include a second outlet port fluidly connected to the outlet port. In such examples, the second outlet port is configured to fluidly connect to a pressure sensor. In some examples, the body and the first bonnet define a first cavity. In some such examples, the first piston diaphragm is positioned in the first cavity to define the first fluid-pressure chamber and a first spring cavity within the first cavity. In such examples, the first piston diaphragm fluidly isolates the first spring cavity from the first fluid-pressure chamber. Further, in some such examples, the pressure-build assembly further includes a first biasing spring positioned in the first spring cavity. In such examples, the first biasing spring engages the first piston diaphragm to bias the first plug toward the first valve seat.

Moreover, in some such examples, the first biasing spring is configured to cause the first piston diaphragm to position the first plug in the first closed position when a first force applied by the first biasing spring to a first side of the first piston diaphragm overcomes a second force applied to an opposing second side of the first piston diaphragm by fluid pressure of fluid within the first fluid-pressure chamber. Additionally, in some such examples, the first piston diaphragm is configured to position the first plug in the first open position when the second force applied by the fluid pressure of the fluid within the first fluid-pressure chamber overcomes the first force applied by the first biasing spring.

Moreover, in some such examples, the pressure-build assembly further comprises a first return spring operatively connected to the first plug. Additionally, in some such examples, the first return spring is positioned in the linking chamber. Additionally, in some such examples, the first biasing spring is configured to cause the first piston diaphragm to position the first plug in the first closed position when a first force applied by the first biasing spring to a first side of the first piston diaphragm is greater than a second force applied to an opposing second side of the first piston diaphragm by a combination of fluid pressure of fluid within the first fluid-pressure chamber and the first return spring. Furthermore, in some such examples, the first piston diaphragm is configured to position the first plug in the first open position when the second force is greater than or equal to the first force.

In some examples, the body and the second bonnet define a second cavity. In some such examples, the second piston diaphragm is positioned in the second cavity to define the second fluid-pressure chamber and a second spring cavity within the second cavity. In such examples, the second piston diaphragm fluidly isolates the second spring cavity from the second fluid-pressure chamber. Further, in some such examples, the final-line assembly further comprises a second biasing spring positioned in the second spring cavity. In such examples, the second biasing spring engages the second piston diaphragm to bias the second plug toward the second valve seat.

Moreover, in some such examples, the second biasing spring is configured to cause the second piston diaphragm to position the second plug in the second closed position when a second force applied by the second biasing spring to a first side of the second piston diaphragm overcomes the second force applied to an opposing second side of the second piston diaphragm by fluid pressure of fluid within the second fluid-pressure chamber. Additionally, in some such examples, the second piston diaphragm is configured to position the second plug in the second open position when the second force applied by the fluid pressure of the fluid within the second fluid-pressure chamber overcomes a first force applied by the second biasing spring.

Moreover, in some such examples, the final-line assembly further comprises a second return spring operatively connected to the second plug. Additionally, in some such examples, the second return spring is positioned in the linking chamber. Additionally, in some such examples, the second biasing spring is configured to cause the second piston diaphragm to position the second plug in the second closed position when a first force applied by the second biasing spring to a first side of the second piston diaphragm is greater than a second force applied to an opposing second side of the second piston diaphragm by a combination of fluid pressure of fluid within the second fluid-pressure chamber and the second return spring. Furthermore, in some such examples, the second piston diaphragm is configured to position the second plug in the second open position when the second force is greater than or equal to the first force.

An example disclosed valve for providing pressurized fluid to a pressurized-fluid consuming device includes a body defining a first tank port and a second tank port configured to fluidly connect to a pressurized tank, an outlet port configured to fluidly connect to the pressurized-fluid consuming device, and a linking chamber fluidly connected to the second tank port. The example disclosed valve also includes a pressure-build assembly that includes a first piston diaphragm at least partially defining a first fluid-pressure chamber that is fluidly connected to the first tank port and a first plug operatively connected to the first piston diaphragm. The first fluid-pressure chamber is fluidly connected to the linking chamber when the first plug is in a first open position. The example disclosed valve also includes a final-line assembly that includes a second piston diaphragm at least partially defining a second fluid-pressure chamber that is fluidly connected to the outlet port and a second plug operatively connected to the second piston diaphragm. The second fluid-pressure chamber is fluidly connected to the linking chamber when the second plug is in a second open position.

In some examples, the pressure-build assembly further includes a first valve seat. The first plug engages the first valve seat in a first closed position and is disengaged from the first valve seat in the first open position. In some such examples, the final-line assembly further includes a second valve seat. The second plug engages the second valve seat in a second closed position and is disengaged from the second valve seat in the second open position.

In some examples, to increase a pressure of the pressurized fluid within the pressurized tank, the first tank port is fluidly connected to a lower portion of the pressurized tank to receive the pressurized fluid in liquid form and the second tank port is fluidly connected to an upper portion of the pressurized tank to provide the pressurized tank with the pressurized fluid in gas form upon vaporization.

In some such examples, the first plug is configured to be in the first open position when the pressure of the pressurized fluid within the first fluid-pressure chamber is less than a first pressure threshold and be in a first closed position to fluid disconnect the first and second tank ports when the pressure of the pressurized fluid within the first fluid-pressure chamber is greater than or equal to the first pressure threshold. Further, in some such examples, when the first tank port is fluidly connected to the pressurized tank, the pressure of the pressurized fluid within the first fluid-pressure chamber equals the pressure of the pressurized fluid within the pressurized tank.

In some such examples, the second plug is configured to be in the second open position when the pressure of the pressurized fluid within the second fluid-pressure chamber is less than a second pressure threshold and be in a second closed position to limit the pressure of the pressurized fluid that is provided to the pressurized-fluid consuming device by fluidly disconnecting the second tank port and the outlet port when the pressure of the pressurized fluid within the second fluid-pressure chamber is greater than or equal to a first pressure threshold. Further, in some such examples, when the outlet port is fluidly connected to the pressurized-fluid consuming device, the pressure of the pressurized fluid within the second fluid-pressure chamber equals the pressure of the pressurized fluid within the pressurized-fluid consuming device.

Some examples further include a second outlet port fluidly connected to the second fluid-pressure chamber. The second outlet port is configured to fluidly connect to a pressure sensor.

In some examples, the pressure-build assembly further includes a first bonnet coupled to the body, and wherein the body and the first bonnet define a first cavity.

In some examples, the first piston diaphragm is positioned in the first cavity to define the first fluid-pressure chamber and a first spring cavity within the first cavity. The first piston diaphragm fluidly isolates the first spring cavity from the first fluid-pressure chamber. In some such examples, the pressure-build assembly further includes a first biasing spring positioned in the first spring cavity. The first biasing spring engages the first piston diaphragm to bias the first plug toward a first closed position of the first plug.

Further, in some such examples, the first biasing spring is configured to cause the first piston diaphragm to position the first plug in the first closed position when a first force applied by the first biasing spring to a first side of the first piston diaphragm overcomes a second force applied to an opposing second side of the first piston diaphragm by fluid pressure of fluid within the first fluid-pressure chamber. The first piston diaphragm is configured to position the first plug in the first open position when the second force applied by the fluid pressure of the fluid within the first fluid-pressure chamber overcomes the first force applied by the first biasing spring.

Further, in some such examples, the pressure-build assembly further includes a first return spring operatively connected to the first plug. The first biasing spring is configured to cause the first piston diaphragm to position the first plug in the first closed position when a first force applied by the first biasing spring to a first side of the first piston diaphragm is greater than a second force applied to an opposing second side of the first piston diaphragm by a combination of fluid pressure of fluid within the first fluid-pressure chamber and the first return spring. The first piston diaphragm is configured to position the first plug in the first open position when the second force is greater than or equal to the first force.

In some examples, the final-line assembly further includes a second bonnet coupled to the body, and wherein the body and the second bonnet define a second cavity. In some such examples, the second piston diaphragm is positioned in the second cavity to define the second fluid-pressure chamber and a second spring cavity within the second cavity. The second piston diaphragm fluidly isolates the second spring cavity from the second fluid-pressure chamber. Further, in some such examples, the final-line assembly further includes a second biasing spring positioned in the second spring cavity. The second biasing spring engages the second piston diaphragm to bias the second plug toward a second closed position of the second plug.

Moreover, in some such examples, the second biasing spring is configured to cause the second piston diaphragm to position the second plug in the second closed position when a second force applied by the second biasing spring to a first side of the second piston diaphragm overcomes the second force applied to an opposing second side of the second piston diaphragm by fluid pressure of fluid within the second fluid-pressure chamber. The second piston diaphragm is configured to position the second plug in the second open position when the second force applied by the fluid pressure of the fluid within the second fluid-pressure chamber overcomes a first force applied by the second biasing spring.

Moreover, in some such examples, the final-line assembly further includes a second return spring operatively connected to the second plug. The second biasing spring is configured to cause the second piston diaphragm to position the second plug in the second closed position when a first force applied by the second biasing spring to a first side of the second piston diaphragm is greater than a second force applied to an opposing second side of the second piston diaphragm by a combination of fluid pressure of fluid within the second fluid-pressure chamber and the second return spring. The second piston diaphragm is configured to position the second plug in the second open position when the second force is greater than or equal to the first force.

Some examples further include a spring support fixedly positioned within the linking chamber. The pressure-build assembly further includes a first return spring that engages the spring support and is operatively connected to the first plug to bias the first plug to a first closed position. The final-line assembly further includes a second return spring that engages the spring support and is operatively connected to the second plug to bias the second plug to a second closed position. In some such examples, the spring support is a filter through which the pressurized fluid is to flow in the linking chamber.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
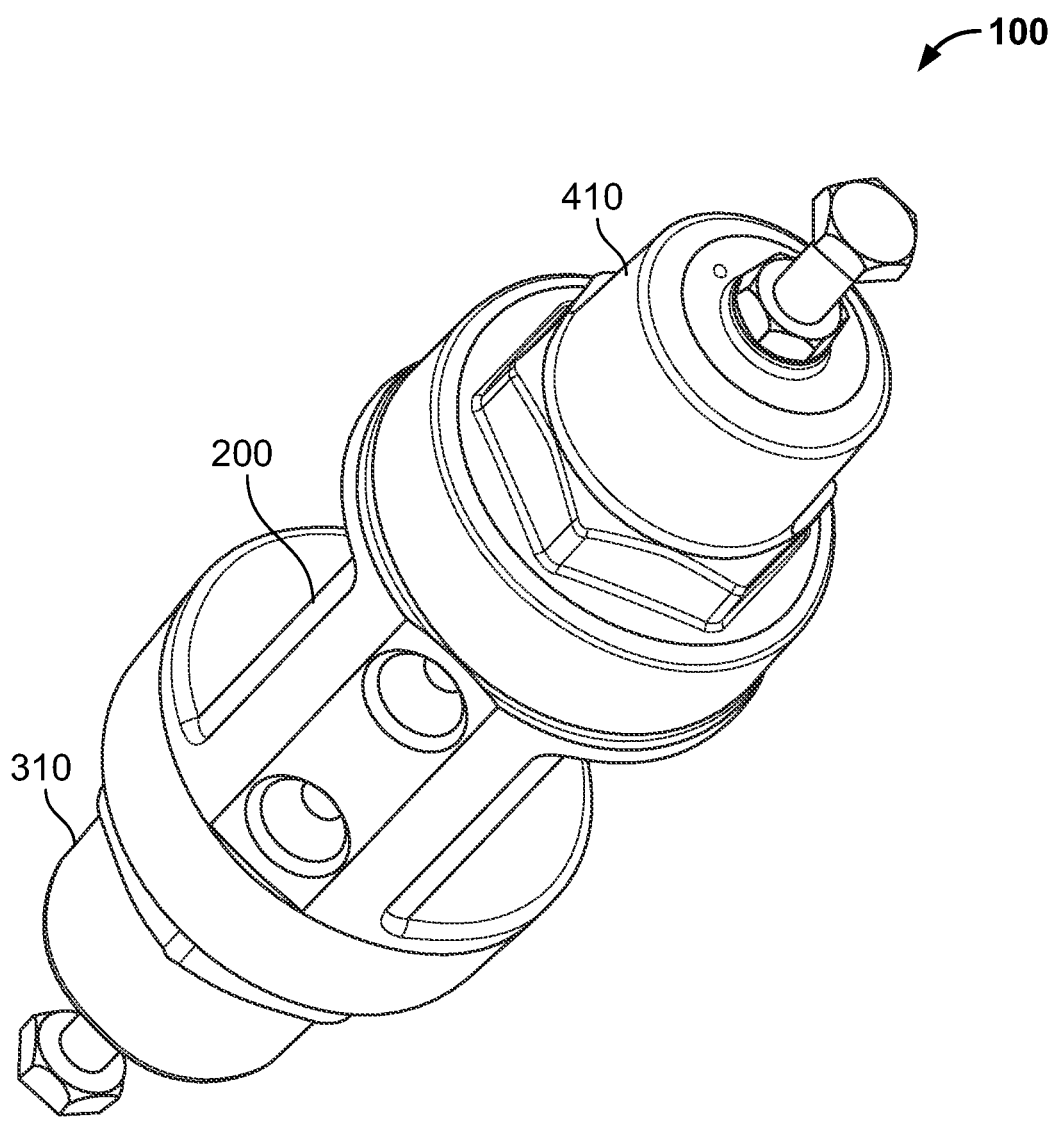
FIG. 1 is a perspective view of an example valve in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

An example valve disclosed herein is configured to operate as both a pressure build operator and a final-line gas regulator. The valve includes a first pressure-sensing diaphragm and/or piston that is configured to build pressure within a pressurized tank (e.g., a pressurized cylinder such as a $CO_2$ cylinder) and a second pressure-sensing diaphragm and/or piston that is configured to regulate gas of a final line to a pressurized-fluid consuming device (e.g., a beverage dispensing machine). Additionally, a body of the valve defines an outlet of a pressure build regulator to be fluidly connected to an inlet of a final-line gas regulator. For example, the body of the valve defines a port that functions as both the outlet of the pressure build regulator and the inlet of the final-line gas regulator. By being configured to perform a combination of both pressure build operation and final-line gas regulation, the example valve disclosed herein reduces (1) the number of components (e.g., including connections, fittings, and valves) to be installed and serviced, (2) the number of potential leak points, and (3) maintenance time and costs.

Figure 2:
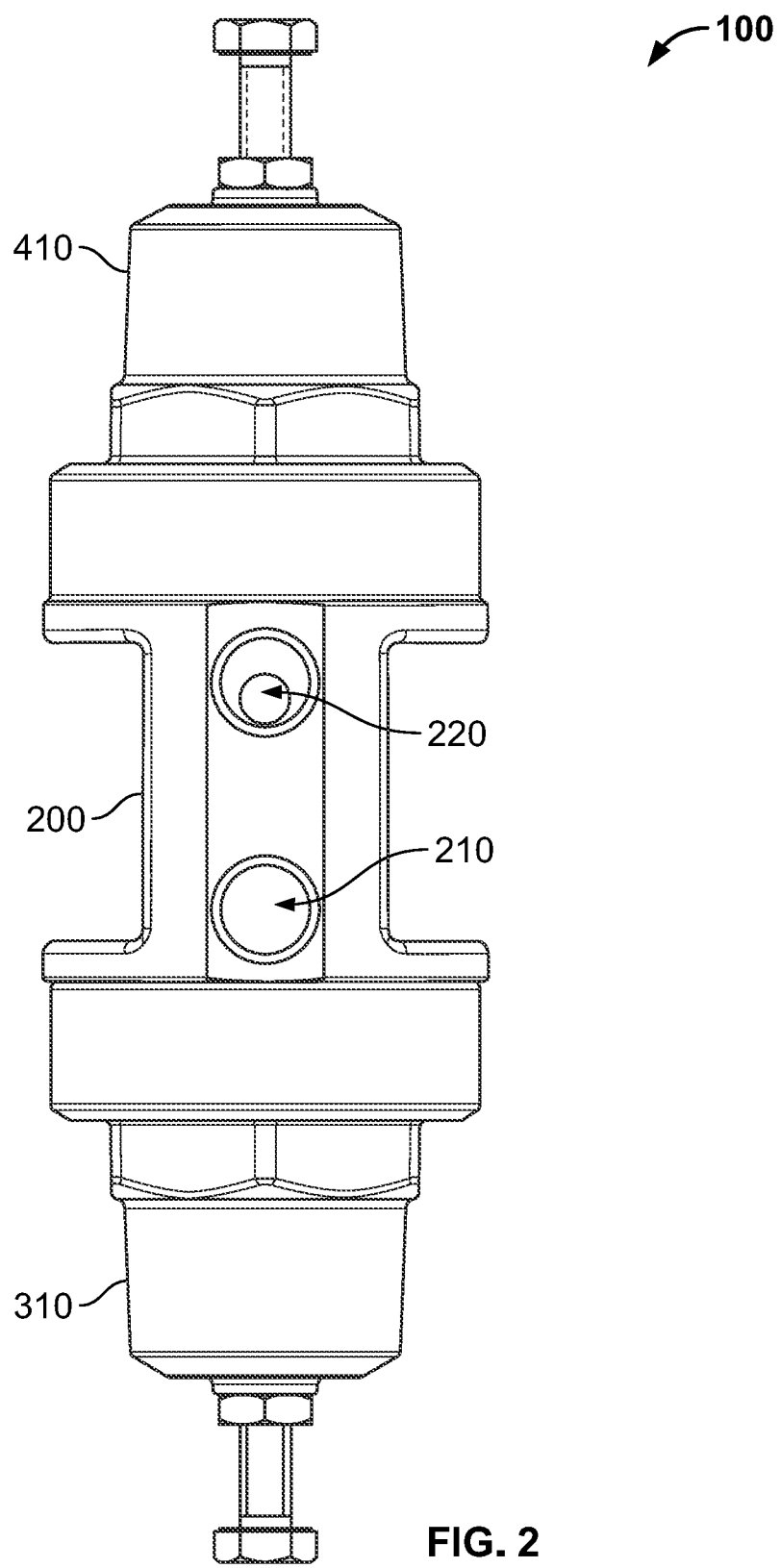
FIG. 2 is a front view of the valve of FIG. 1.
Figure 3:
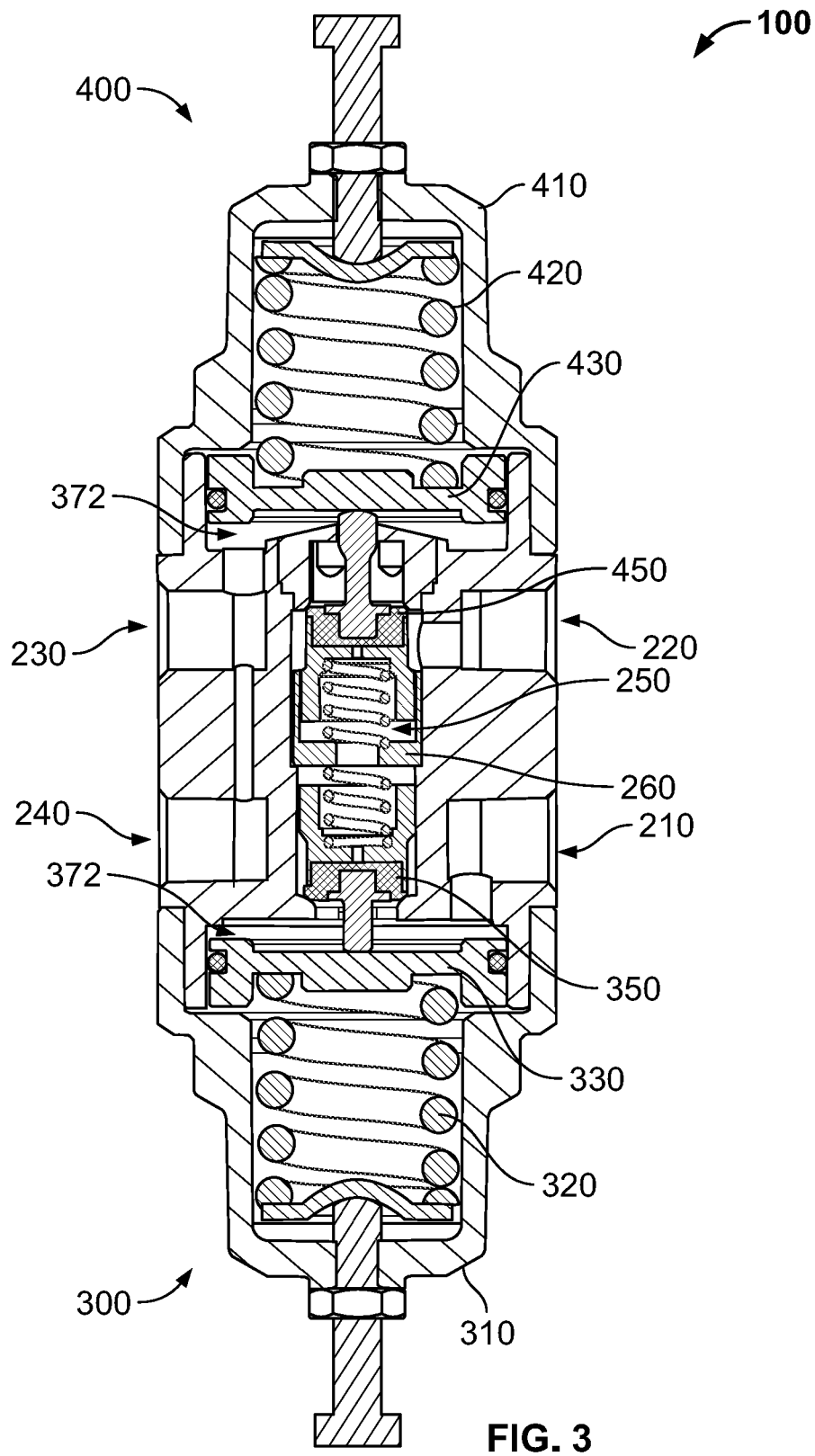
FIG. 3 is a side, cross-sectional view of the valve of FIG. 1.
Figure 4:
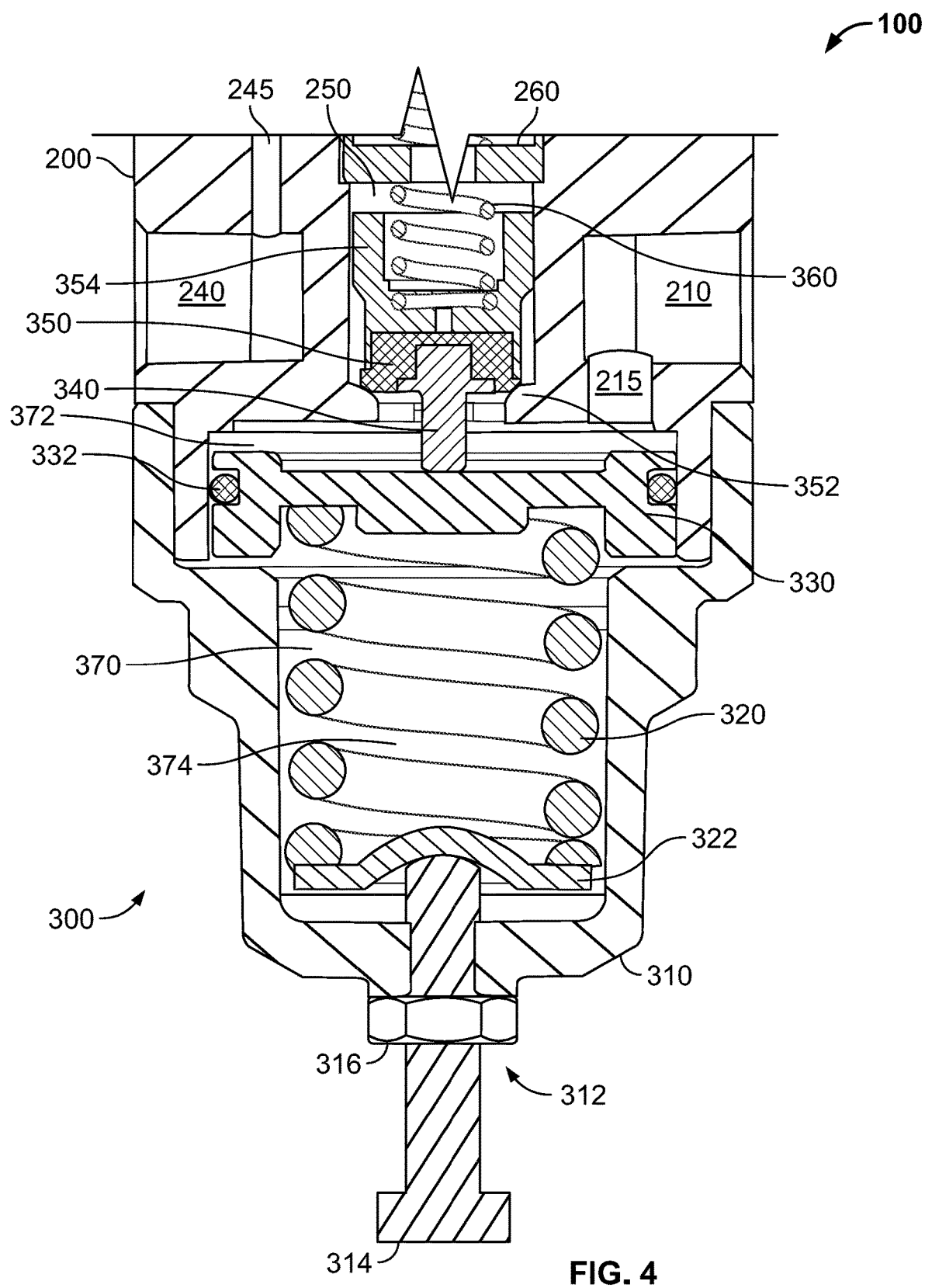
FIG. 4 is an expanded view of a first portion of the cross-sectional view of FIG. 3.
Figure 5:
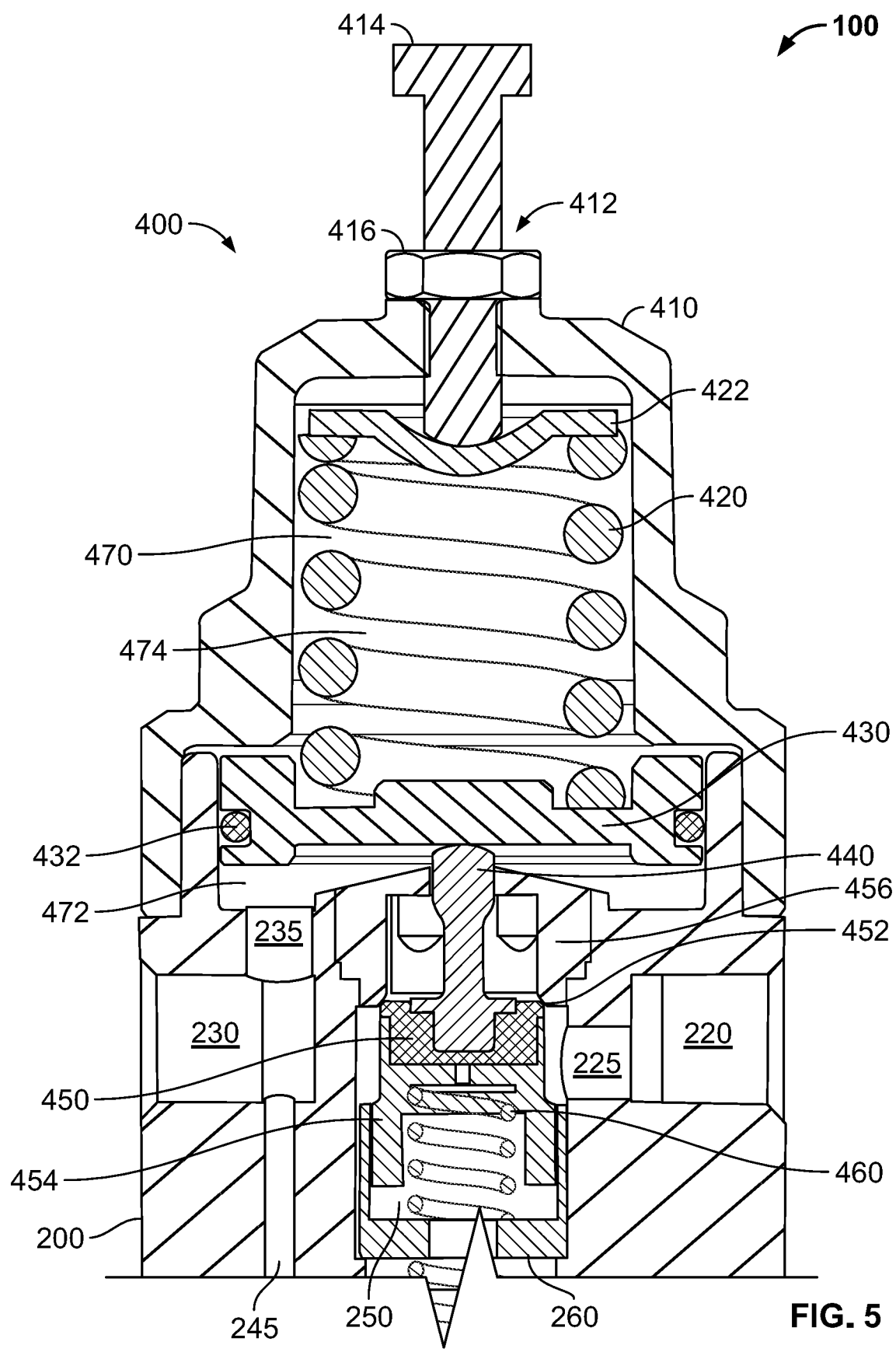
FIG. 5 is an expanded view of a second portion of the cross-sectional view of FIG. 3.

Turning to the figures, FIGS. 1-5 illustrate an example valve 100 in accordance with the teachings herein. FIGS. 1-2 illustrate outer portions of the valve 100 including a body 200, a bonnet 310 coupled to a first end of the body 200, and another bonnet 410 coupled to an opposing second end of the body 200. FIGS. 3-5 are cross-sections of the valve 100 that depicts components disposed within the body 200, the bonnet 310, and the bonnet 410.

As illustrated in FIG. 3, the body 200 of the valve 100 defines a tank port 210, a tank port 220, an outlet port 230, and an outlet port 240. The tank port 210 is configured to connect to piping (e.g., piping 542 of FIG. 10) that fluidly connects the valve 100 to a lower portion of a pressurized tank (e.g., a pressurized tank 510 of FIG. 10). The tank port 220 is configured to connect to piping (e.g., piping 544 of FIG. 10) that fluidly connects the valve 100 to an upper portion of the pressurized tank 510. The outlet port 230 is configured to connect to piping (e.g., piping 546 of FIG. 10) that fluidly connects the valve 100 to a pressurized-fluid consuming device (e.g., a pressurized-fluid consuming device 520 of FIG. 10), and the outlet port 240 is configured to connect to piping (e.g., piping 548 of FIG. 10) that fluidly connects the valve 100 to a pressure sensor (e.g., a pressure sensor 530 of FIG. 10). Additionally, the body 200 defines a linking chamber 250 that is configured to fluidly connect the tank port 210 to the tank port 220 and the tank port 220 to the outlet port 230.

To operate as a pressure-build regulator and increase a pressure of fluid within the pressurized tank 510, the tank port 210 is fluidly connected to the lower portion to receive the pressurized fluid in liquid form and the tank port 220 is fluidly connected to the upper portion to provide the pressurized tank 510 with the pressurized fluid in gas form upon vaporization. Additionally, to operate as a final-line regulator, the tank port 220 is fluidly connected to the upper portion of the pressurized tank 510 to receive the pressurized fluid in gas form and the outlet port 230 is fluidly connected to the pressurized-fluid consuming device 520 to provide the pressurized gas to the pressurized-fluid consuming device 520 at a regulated pressure.

As illustrated in FIG. 4, the body 200 of the valve 100 defines a passageway 215 that extends from the tank port 210 to fluidly connect the tank port 210 to a fluid-pressure chamber 372. As illustrated in FIG. 5, the body 200 defines a passageway 225 extending from the tank port 220 to fluidly connect the tank port 220 to the linking chamber 250. The body 200 also defines a passageway 235 that extends from the outlet port 230 to fluidly connect the outlet port 230 to a fluid-pressure chamber 472. Further, as illustrated in FIGS. 3-5, the body 200 defines a passageway extending between and fluidly connecting the outlet port 230 and the outlet port 240.

Returning to FIG. 4, the bonnet 310 of a pressure-build assembly 300 couples to one end of the body 200. For example, the bonnet 310 is threadably coupled to the body 200. The pressure-build assembly 300 of the valve 100 is configured to operate as a pressure-build regulator to increase pressure within the fluidly-connected pressurized tank 510. In the illustrated example, the pressure-build assembly 300 includes a piston diaphragm 330 (alternatively referred to as a piston or a diaphragm) that is positioned within a cavity 370 formed by the body 200 and/or the bonnet 310. The piston diaphragm 330 is positioned within the cavity 370 in a manner that defines the fluid-pressure chamber 372 and a spring chamber 374. Additionally, the piston diaphragm 330 is fluidly isolated from the spring chamber 374. For example, an O-ring 332 of the pressure-build assembly 300 extends circumferentially around the piston diaphragm 330 and sealingly engages an inner wall defining the cavity 370 to prevent fluid within the fluid-pressure chamber 372 from flowing into the spring chamber 374. In other examples, the pressure-build assembly 300 includes a plurality of O-rings that extend circumferentially around the piston diaphragm 330.

The pressure-build assembly 300 also includes a biasing spring 320 positioned within the spring chamber 374. The biasing spring 320 engages a side of the piston diaphragm 330 to bias the piston diaphragm 330 toward a closed position. In the illustrated example, the pressure-build assembly 300 includes a bolt 314, a nut 316, and a plate 322 to enable the biasing force to be adjusted. For example, while one end of the biasing spring 320 engages the piston diaphragm 330, the opposing end of the biasing spring 320 engages the plate 322. The position of the plate 322 is adjusted via the bolt 314 to adjust the compression of the biasing spring 320. The bolt 314 extends through a bonnet aperture 312 defined by the bonnet 310 and is threadably received by the nut 316 to securely position the bolt 314 and, thus, the biasing spring 320 in place.

The pressure-build assembly 300 further includes a stem 340, a plug 350, a valve seat 352, a plug cage 354, and a return spring 360. The plug 350 is coupled to the plug cage 354. In some examples, the plug 350 is coupled to the plug cage 354 via threads. In other examples, the plug 350 is coupled to the plug cage 354 via an insert (e.g., a polytetrafluoroethylene insert) pressed between the plug 350 and the plug cage 354. The return spring 360 is positioned to apply a force to a back side of the plug cage 354.

Further, as illustrated in FIG. 4, each of the plug 350, the valve seat 352, and the return spring 360 are positioned within the linking chamber 250. A first end of the return spring 360 engages a spring support 260 that is fixedly positioned within the linking chamber 250. The spring support 260 defines an aperture to enable fluid to flow through the linking chamber 250. A second end of the of the return spring 360 engages the back side of the plug cage 354 to bias the plug 350 to a closed position at which the plug 350 selectively engages the valve seat 352 defined by the body 200. Additionally, the stem 340 is positioned between and engages both the piston diaphragm 330 and the plug 350 to operatively connect the plug 350 to the piston diaphragm 330.

The piston diaphragm 330 is configured to move based on a difference of forces applied to opposing sides of the piston diaphragm 330. The biasing spring 320 applies a first force to a first side of the piston diaphragm 330. A combination of (i) the return spring 360 and (ii) pressure of fluid within the fluid-pressure chamber 372 applies a second force to an opposing second side of the piston diaphragm 330. Because the fluid-pressure chamber 372 is fluidly connected to the pressurized tank 510, the pressure of the fluid within the fluid-pressure chamber 372 is equal to that within the pressurized tank 510.

If the force applied by the biasing spring 320 is less than or equal to that applied by the return spring 360 and the pressurized fluid, the piston diaphragm 330 is pushed to the position shown in FIGS. 3 and 4. In turn, the return spring 360 pushes the plug 350 to sealingly engage the valve seat 352 in the closed position. When the plug 350 is in the closed position, the pressurized fluid is prevented from flowing from the tank port 210 to the tank port 220 to build pressure within the pressurized tank 510. That is, the pressure-build regulator of the valve 100 is inactive when the plug 350 of the pressure-build assembly 300 is in the closed position.

If the force applied by the biasing spring 320 is greater than that applied by the return spring 360 and the pressurized fluid, the biasing spring 320 pushes the piston diaphragm 330 to move toward the linking chamber 250. In turn, the piston diaphragm 330 pushes the stem 340 in the same direction, and the stem 340 pushes the plug 350 to disengage from the valve seat 352 and be in an open position. When the plug 350 is in the open position, the fluid-pressure chamber 372 is fluidly connected to the linking chamber 250 such that the tank port 220 is fluidly connected to the tank port 210 via the fluid-pressure chamber 372 and the linking chamber 250. In turn, the pressurized fluid flows through the linking chamber 250 and out through the tank port 220 to increase pressure within the pressurized tank 510. That is, the pressure-build regulator of the valve 100 is active when the plug 350 of the pressure-build assembly 300 is in the open position.

Returning to FIG. 5, the bonnet 410 of a final-line assembly 400 couples to an end of the body 200 opposite to that of the bonnet 310. For example, the bonnet 410 is threadably coupled to the body 200. The final-line assembly 400 of the valve 100 is configured to operate as a final-line gas regulator to limit the pressure of the pressurized fluid that is provided to the pressurized-fluid consuming device 520. In the illustrated example, the final-line assembly 400 includes a piston diaphragm 430 (alternatively referred to as a piston or a diaphragm) that is positioned within a cavity 470 formed by the body 200 and/or the bonnet 410. The piston diaphragm 430 is positioned within the cavity 470 in a manner that defines the fluid-pressure chamber 472 and a spring chamber 474. Additionally, the piston diaphragm 430 is fluidly isolated from the spring chamber 474. For example, an O-ring 432 of the final-line assembly 400 extends circumferentially around the piston diaphragm 430 and sealingly engages an inner wall defining the cavity 470 to prevent fluid within the fluid-pressure chamber 472 from flowing into the spring chamber 474. In other examples, the final-line assembly 400 includes a plurality of O-rings that extend circumferentially around the piston diaphragm 430.

The final-line assembly 400 also includes a biasing spring 420 positioned within the spring chamber 474. The biasing spring 420 engages a side of the piston diaphragm 430 to bias the piston diaphragm 430 toward a closed position. In the illustrated example, the final-line assembly 400 includes a bolt 414, a nut 416, and a plate 422 to enable the biasing force to be adjusted. For example, while one end of the biasing spring 420 engages the piston diaphragm 430, the opposing end of the biasing spring 420 engages the plate 422. The position of the plate 422 is adjusted via the bolt 414 to adjust the compression of the biasing spring 420. The bolt 414 extends through a bonnet aperture 412 defined by the bonnet 410 and is threadably received by the nut 416 to securely position the bolt 414 and, thus, the biasing spring 420 in place.

The final-line assembly 400 further includes a stem 440, a plug 450, a valve seat 452, a plug cage 454, and a return spring 460. The plug 450 is coupled to the plug cage 454. In some examples, the plug 450 is coupled to the plug cage 454 via threads. In other examples, the plug 450 is coupled to the plug cage 454 via an insert (e.g., a polytetrafluoroethylene insert) pressed between the plug 450 and the plug cage 454. The return spring 460 is positioned to apply a force to a back side of the plug cage 454.

Further, as illustrated in FIG. 5, each of the plug 450, the valve seat 452, and the return spring 460 are positioned within the linking chamber 250. A first end of the return spring 460 engages the spring support 260, which is fixedly positioned within the linking chamber 250, opposite the return spring 360. A second end of the of the return spring 460 engages the back side of the plug cage 454 to bias the plug 450 to a closed position at which the plug 450 selectively engages the valve seat 452 defined by the body 200.

The valve seat 452 is defined by a valve seat body 456 of the final-line assembly 400. The valve seat body 456 is fixedly coupled to the body 200 adjacent an end of the linking chamber 250. The valve seat body 456 defines one or more openings to enable fluid to flow from the linking chamber 250 to the fluid-pressure chamber 472 when the plug 450 is disengaged from the valve seat 452. Additionally, the valve seat body 456 defines an aperture through which the stem 440 slidably extends. The stem 440 is positioned between and engages both the piston diaphragm 430 and the plug 450 to operatively connect the plug 450 to the piston diaphragm 430.

The piston diaphragm 430 is configured to move based on a difference of forces applied to opposing sides of the piston diaphragm 430. The biasing spring 420 applies a first force to a first side of the piston diaphragm 430. A combination of (i) the return spring 460 and (ii) pressure of fluid within the fluid-pressure chamber 472 applies a second force to an opposing second side of the piston diaphragm 430. Because the fluid-pressure chamber 472 is fluidly connected to the pressurized-fluid consuming device 520, the pressure of the fluid within the fluid-pressure chamber 472 is equal to that of the pressurized-fluid consuming device 520.

If the force applied by the biasing spring 420 is less than or equal to that applied by the return spring 460 and the pressurized fluid, the piston diaphragm 430 is pushed to the position shown in FIGS. 3 and 5. In turn, the return spring 460 pushes the plug 450 to sealingly engage the valve seat 452 in the closed position. When the plug 450 is in the closed position, the pressurized fluid is prevented from providing the pressurized fluid to the pressurized-fluid consuming device 520. That is, the final-line gas regulator of the valve 100 is inactive when the plug 450 of the final-line assembly 400 is in the closed position.

If the force applied by the biasing spring 420 is greater than that applied by the return spring 460 and the pressurized fluid, the biasing spring 420 pushes the piston diaphragm 430 to move toward the linking chamber 250. In turn, the piston diaphragm 430 pushes the stem 440 in the same direction, and the stem 440 pushes the plug 450 to disengage from the valve seat 452 and be in an open position. When the plug 450 is in the open position, the linking chamber 250 is fluidly connected to the fluid-pressure chamber 472 such that the outlet port 230 is fluidly connected to the tank port 220 via the linking chamber 250 and the fluid-pressure chamber 472. In turn, the pressurized fluid flows from the tank port 220 and out through the outlet port 230 to provide the pressurized fluid to the pressurized-fluid consuming device 520. That is, the final-line gas regulator of the valve 100 is active when the plug 450 of the final-line assembly 400 is in the open position.

FIGS. 6-9 depict another example valve 1000 in accordance with the teachings herein that is configured to operate as both a pressure build operator and a final-line gas regulator. The valve 1000 of the illustrated example includes components that are identical and/or substantially similar to respective components of the valve 100 of FIGS. 1-5, unless otherwise disclosed below. Because components of the valve 100 have been described in detail in connection with FIGS. 1-5, some of those features of the valve 1000 that are identical and/or substantially similar to respective components of the valve 100 to are not described in further detail below for concision.

Figure 6:
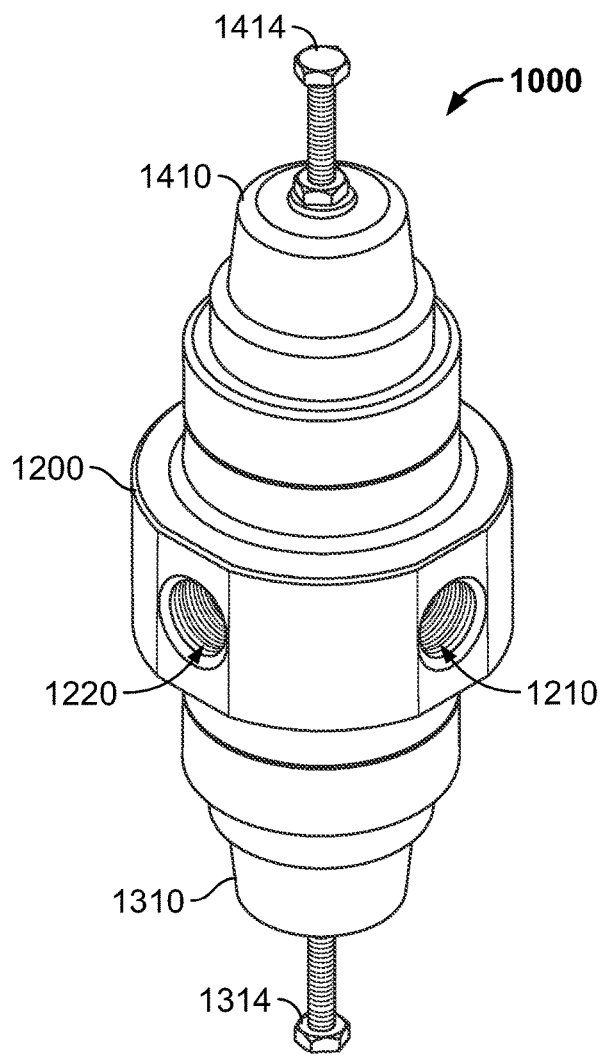
FIG. 6 is a perspective view of another example valve in accordance with the teachings herein.
Figure 7:
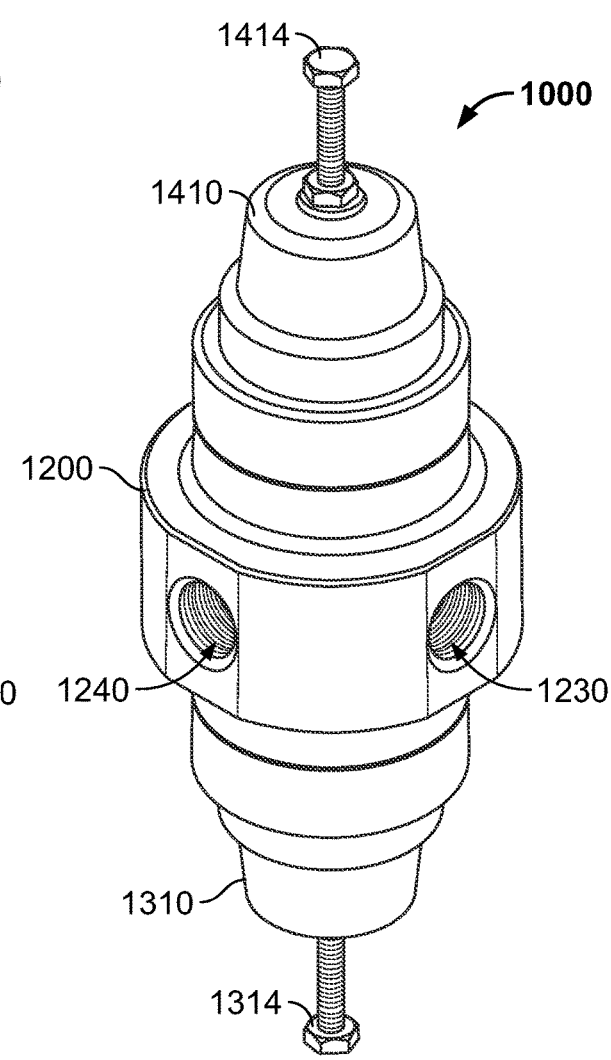
FIG. 7 is another perspective view of the valve of FIG. 6.

As shown in FIGS. 6-7, the valve 1000 including a body 1200, a bonnet 1310 coupled to a first end of the body 1200, and another bonnet 1410 coupled to an opposing second end of the body 1200. The body 1200 defines a tank port 1210, a tank port 1220, an outlet port 1230, and an outlet port 1240 that are arranged circumferentially about the body 1200. In the illustrated example, the tank ports 1210, 1220 and the outlet ports 1230, 1240 are spaced apart from each other equidistantly about the outer circumference of the body such that each port is spaced 90 degrees from two adjacent ports and 180 degrees from an opposing port. The ports are arranged circumferentially about the body 1200 to facilitate installation of valve 1000, for example, by (1) facilitating alignment of the ports with a corresponding pressurized tank and/or pressurized-fluid consuming device and/or (2) enabling a wrench to be more easily turned when connecting piping to the ports.

Figure 8:
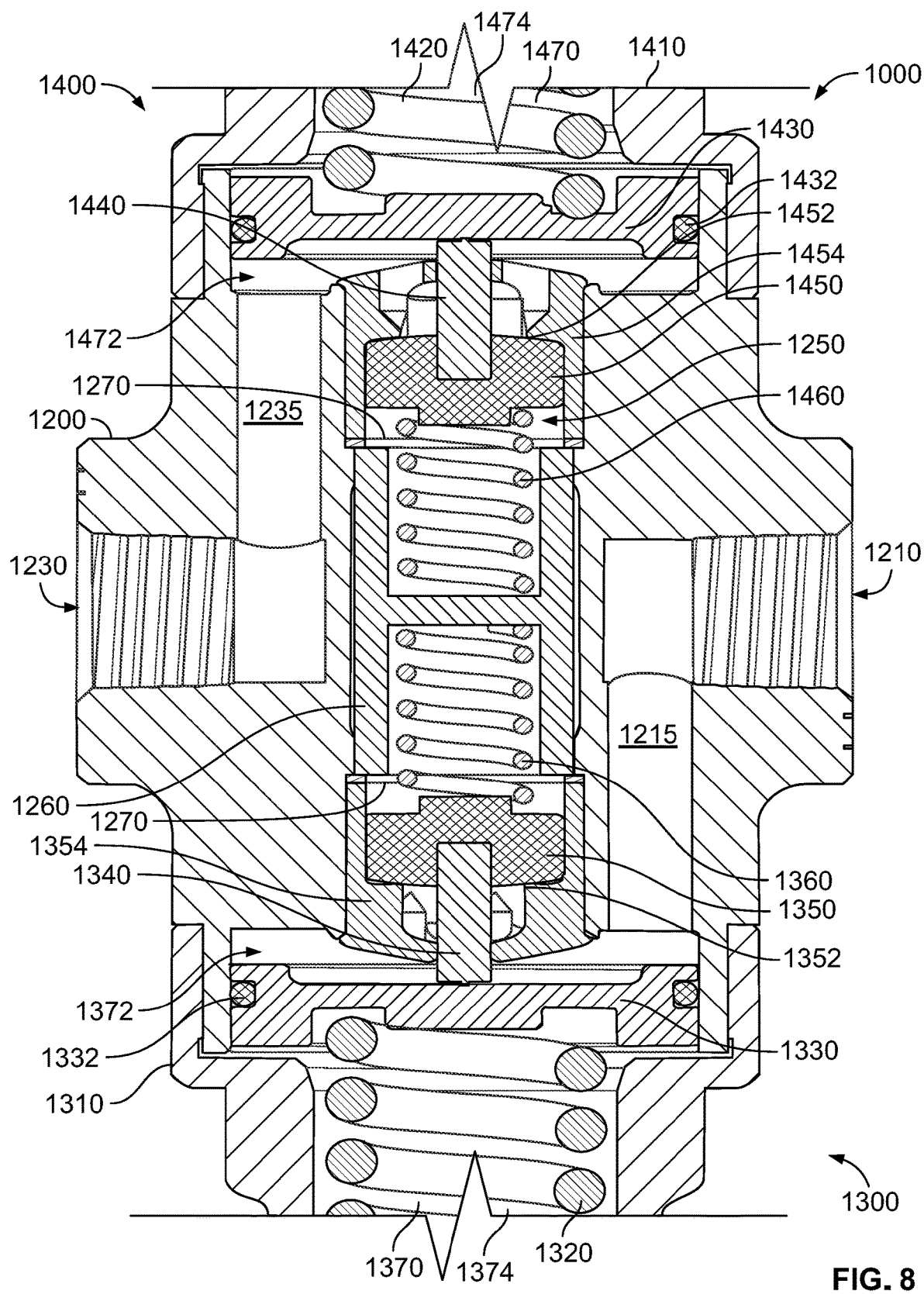
FIG. 8 is a side, cross-sectional view of the valve of FIG. 6.
Figure 9:
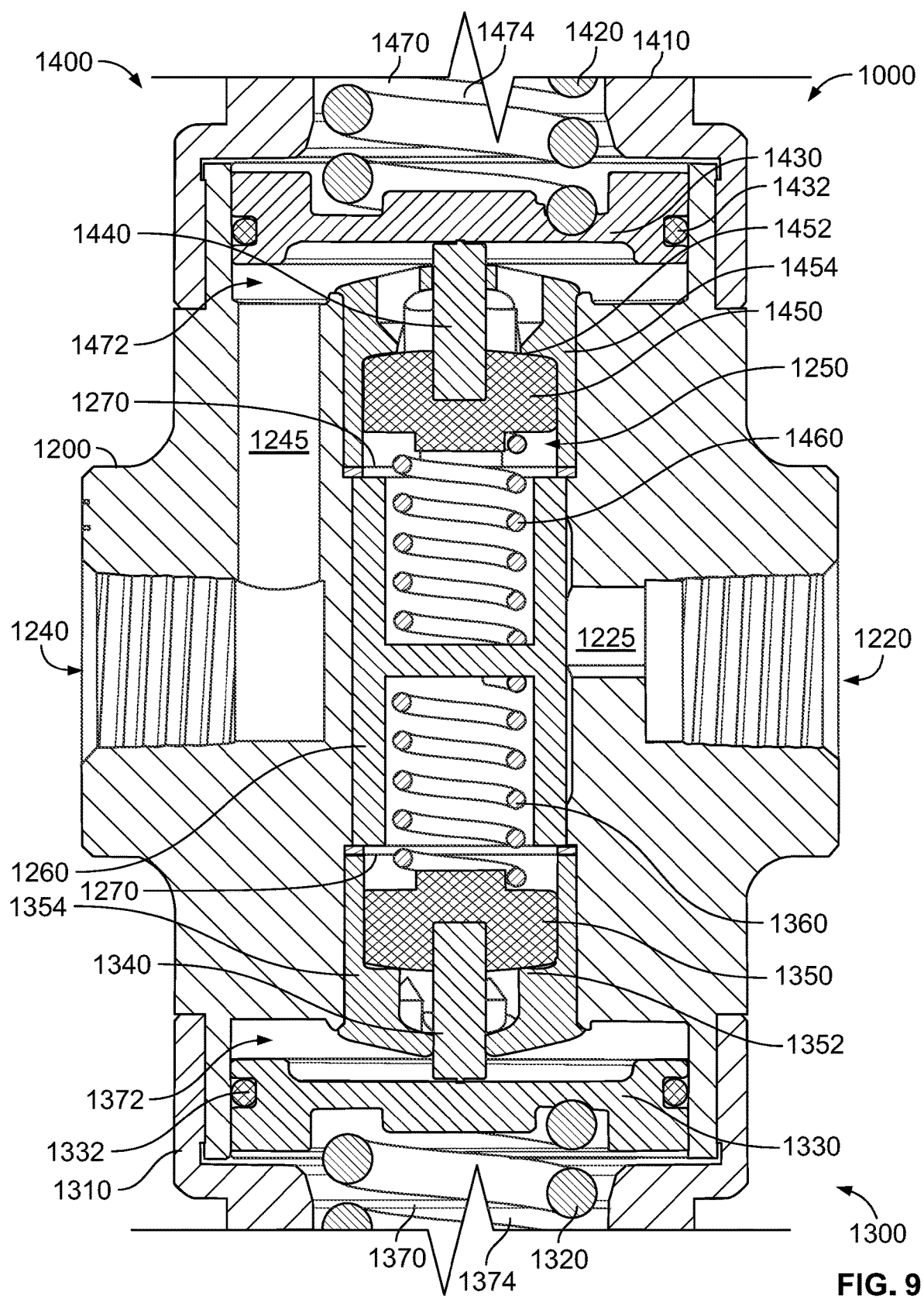
FIG. 9 is another side, cross-sectional view of the valve of FIG. 6.

FIGS. 8-9 are cross-sections that depicts internal components disposed of the valve 1000. More specifically, FIG. 8 depicts a cross-section of the valve 1000 along a plane that intersects the center axis of the valve 1000, the tank port 1210, and the outlet port 1230. FIG. 9 depicts a cross-section of the valve 1000 along a perpendicular plane that intersects the center axis of the valve 1000, the tank port 1220, and the outlet port 1240.

As illustrated in FIGS. 8-9, the body 1200 defines a linking chamber 1250 that is configured to fluidly connect the tank port 1210 to the tank port 1220 and the tank port 1220 to the outlet ports 1230, 1240. The body 1200 defines a passageway 1215 that fluidly connects the tank port 1210 to a fluid-pressure chamber 1372, a passageway 1225 that fluidly connects the tank port 1220 to the linking chamber 1250, a passageway 1235 that fluidly connects the outlet port 1230 to a fluid-pressure chamber 1472, and a passageway 1245 that fluidly connects the outlet port 1240 to the fluid-pressure chamber 1472.

In the illustrated example, a pressure-build assembly 1300 includes the bonnet 1310. The pressure-build assembly 300 also includes a piston diaphragm 1330 positioned within a cavity 1370 formed by the body 1200 and/or the bonnet 1310 to define the fluid-pressure chamber 1372 and a spring chamber 1374. An O-ring 1332 of the pressure-build assembly 1300 extends circumferentially around the piston diaphragm 1330 to prevent fluid within the fluid-pressure chamber 1372 from flowing into the spring chamber 1374. A biasing spring 1320 of the pressure-build assembly 1300 is positioned within the spring chamber 374 and engages a side of the piston diaphragm 1330 to bias the piston diaphragm 1330 toward a closed position. The pressure-build assembly 300 includes a bolt 1314, a nut, and a plate for adjustment of the biasing force. The pressure-build assembly 300 also includes a stem 1340, a plug 1350, a valve seat 1352, a plug cage 1354, and a return spring 1360. The plug cage 1354 defines the valve seat 1352, the plug 1350 is coupled to the plug cage 1354, the stem 340 is positioned between and engages both the piston diaphragm 330 and the plug 350, and the return spring 1360 is positioned to apply a force to a back side of the plug cage 1354. Each of the plug 1350, the valve seat 1352, and the return spring 1360 is positioned within the linking chamber 1250. The return spring 1360 engages a spring support 1260 that is fixedly positioned within the linking chamber 1250. For example, the spring support 1260 is held in place via press fit by two seats defined by the body 1200. Further, a gasket 1270 (e.g., a silicon gasket) is placed at each end of the spring support 1260 within the linking chamber 1250 adjacent a respective seat of the body 1200. In the illustrated example, the spring support 1260 is a filter (e.g., a sintered filter) that enables fluid to flow through the linking chamber 250. The spring support 1260 filters the fluid to prevent debris and/or contaminants from (1) flowing to the outlet ports 1230, 1240 and/or (2) from reaching a valve seat 1452 that is downstream and preventing a corresponding plug 1450 from closing fully.

The piston diaphragm 1330 is configured to move based on a difference of forces applied to opposing sides of the piston diaphragm 1330. The biasing spring 1320 applies a first force to a first side of the piston diaphragm 1330. A combination of (i) the return spring 1360 and (ii) pressure of fluid within the fluid-pressure chamber 1372 applies a second force to an opposing second side of the piston diaphragm 1330. Because the fluid-pressure chamber 1372 is fluidly connected to a pressurized tank, the pressure of the fluid within the fluid-pressure chamber 1372 is equal to that within the pressurized tank. If the force applied by the biasing spring 1320 is less than or equal to that applied by the return spring 1360 and the pressurized fluid, the piston diaphragm 1330 is pushed to a position that causes the return spring 1360 to push the plug 1350 to sealingly engage the valve seat 1352 in the closed position and, in turn, build pressure within the pressurized tank. If the force applied by the biasing spring 1320 is greater than that applied by the return spring 1360 and the pressurized fluid, the piston diaphragm 1330 is pushed by the biasing spring 1320. In turn, the piston diaphragm 1330 pushes the stem 1340 and the plug 1350 to cause the plug 1350 to disengage from the valve seat 1352 and increase pressure within the pressurized tank.

A final-line assembly 1400 of the illustrated example includes the bonnet 1410, a piston diaphragm 1430, and an O-ring 1432. The piston diaphragm 1430 is positioned within a cavity 1470 formed by the body 1200 and/or the bonnet 1410 to define the fluid-pressure chamber 1472 and a spring chamber 1474. The O-ring 1432 extends circumferentially around the piston diaphragm 1430 to prevent fluid within the fluid-pressure chamber 1472 from flowing into the spring chamber 1474. A biasing spring 420 of the final-line assembly 1400 is positioned within the spring chamber 1474 and engages a side of the piston diaphragm 1430 to bias the piston diaphragm 1430 toward a closed position. The final-line assembly 1400 includes a bolt 1414, a nut, and a plate for adjustment of the biasing force. The final-line assembly 1400 further includes a stem 1440, the plug 1450, the valve seat 1452, a plug cage 1454, and a return spring 1460. The valve seat 1452 is defined by the plug cage 1454, the plug 1450 is coupled to the plug cage 1454, the stem 1440 is positioned between and engages both the piston diaphragm 1430 and the plug 1450, and the return spring 1460 is positioned to apply a force to a back side of the plug cage 1454. Each of the plug 1450, the valve seat 1452, and the return spring 1460 is positioned within the linking chamber 1250. The return spring 460 engages the spring support 1260 opposite the return spring 1360.

The piston diaphragm 430 is configured to move based on a difference of forces applied to opposing sides of the piston diaphragm 1430. The biasing spring 1420 applies a first force to a first side of the piston diaphragm 1430. A combination of (i) the return spring 1460 and (ii) pressure of fluid within the fluid-pressure chamber 1472 applies a second force to an opposing second side of the piston diaphragm 1430. Because the fluid-pressure chamber 1472 is fluidly connected to a pressurized-fluid consuming device, the pressure of the fluid within the fluid-pressure chamber 1472 is equal to that of the pressurized-fluid consuming device. If the force applied by the biasing spring 1420 is less than or equal to that applied by the return spring 1460 and the pressurized fluid, the piston diaphragm 430 is pushed to a position that causes the return spring 1460 to push the plug 1450 to sealingly engage the valve seat 1452 in the closed position and, in turn, prevent the pressurized fluid from being provided to the pressurized-fluid consuming device. If the force applied by the biasing spring 1420 is greater than that applied by the return spring 1460 and the pressurized fluid, the biasing spring 1420 pushes the piston diaphragm 1430. In turn, the piston diaphragm 1430 pushes the stem 440 and the plug 1450 to cause the plug 1450 to disengage from the valve seat 1452 and be in an open position and provide the pressurized fluid to the pressurized-fluid consuming device.

Figure 10:
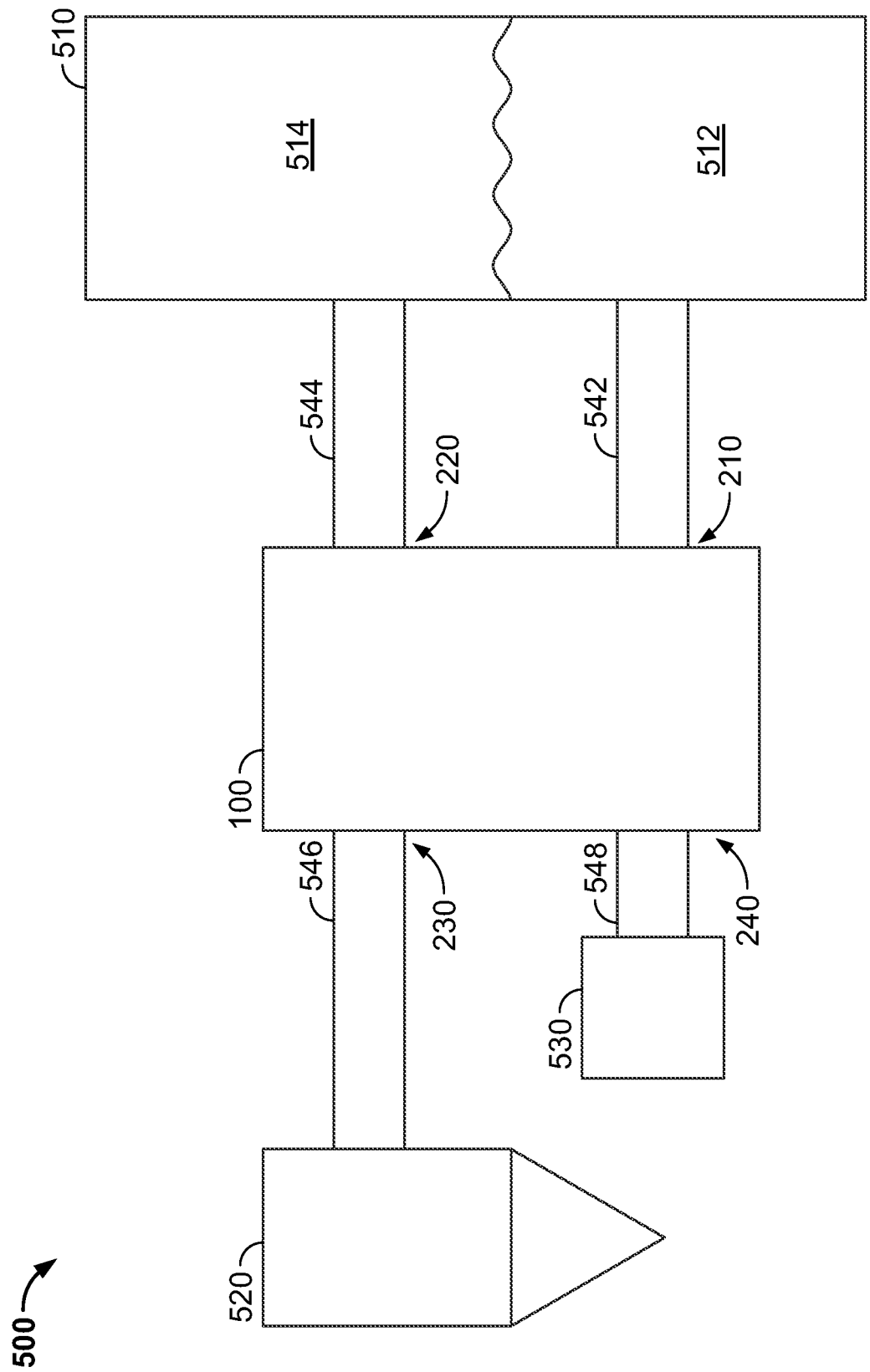
FIG. 10 depicts an example system in which a valve operates as a pressure builder and a final-line gas regulator in accordance with the teachings herein.

FIG. 10 depicts an example system 500 in which a valve, such as the valve 100 and/or the valve 1000, operates as a pressure-build valve and a final-line gas-regulator valve in accordance with the teachings herein. In the illustrated example, the system 500 includes the valve 100, a pressurized tank 510 (e.g., a pressurized cylinder such as a $CO_2$ cylinder), a pressurized-fluid consuming device 520 (e.g., a beverage dispensing machine for carbonated beverages), and a pressure sensor 530. For example, the pressure sensor 530 enables an operator and/or service provider to monitor the fluid pressure of the pressurized-fluid consuming device 520. The system 500 also includes piping 542 that fluidly connects the tank port 210 to a lower portion of the pressurized tank 510, piping 544 that fluidly connects the tank port 220 to an upper portion of the pressurized tank 510, piping 546 that fluidly connects the outlet port 230 to the pressurized-fluid consuming device 520, and piping 548 that fluidly connects the outlet port 240 to the pressure sensor 530.

In operation, when the pressure of fluid within the pressurized tank 510 is less than a first threshold, a pressure-build flow-path of the valve 100 opens to build and maintain the pressure within the pressurized tank 510. For example, when the pressure-build flow path is open, pressurized liquid 512 flows from the pressurized tank 510, through the piping 542, and through the pressure-build flow path of the valve 100. The pressurized liquid 512 is vaporized into gas form as it flows through the pressure-build flow path to the valve 100. Subsequently, pressurized gas 514 flows through the piping 544 and is provided to the pressurized tank 510 in gas form as the pressurized gas 514.

When the pressure of fluid of the pressurized-fluid consuming device 520 is less than a second threshold, a final-line flow-path of the valve 100 opens to provide the pressurized gas 514 to the pressurized-fluid consuming device 520. For example, when the final-line flow path is open, the pressurized gas 514 flows from the pressurized tank 510, through the piping 544, through the final-line flow path of the valve 100, through the piping 546, and to the pressurized-fluid consuming device 520.

While the system 500 is shown to include the valve 100 in FIG. 10, the system 500 can alternatively include an other valve, such as the valve 1000, that is configured to operate as both a pressure build operator and a final-line gas regulator.

Figure 11:
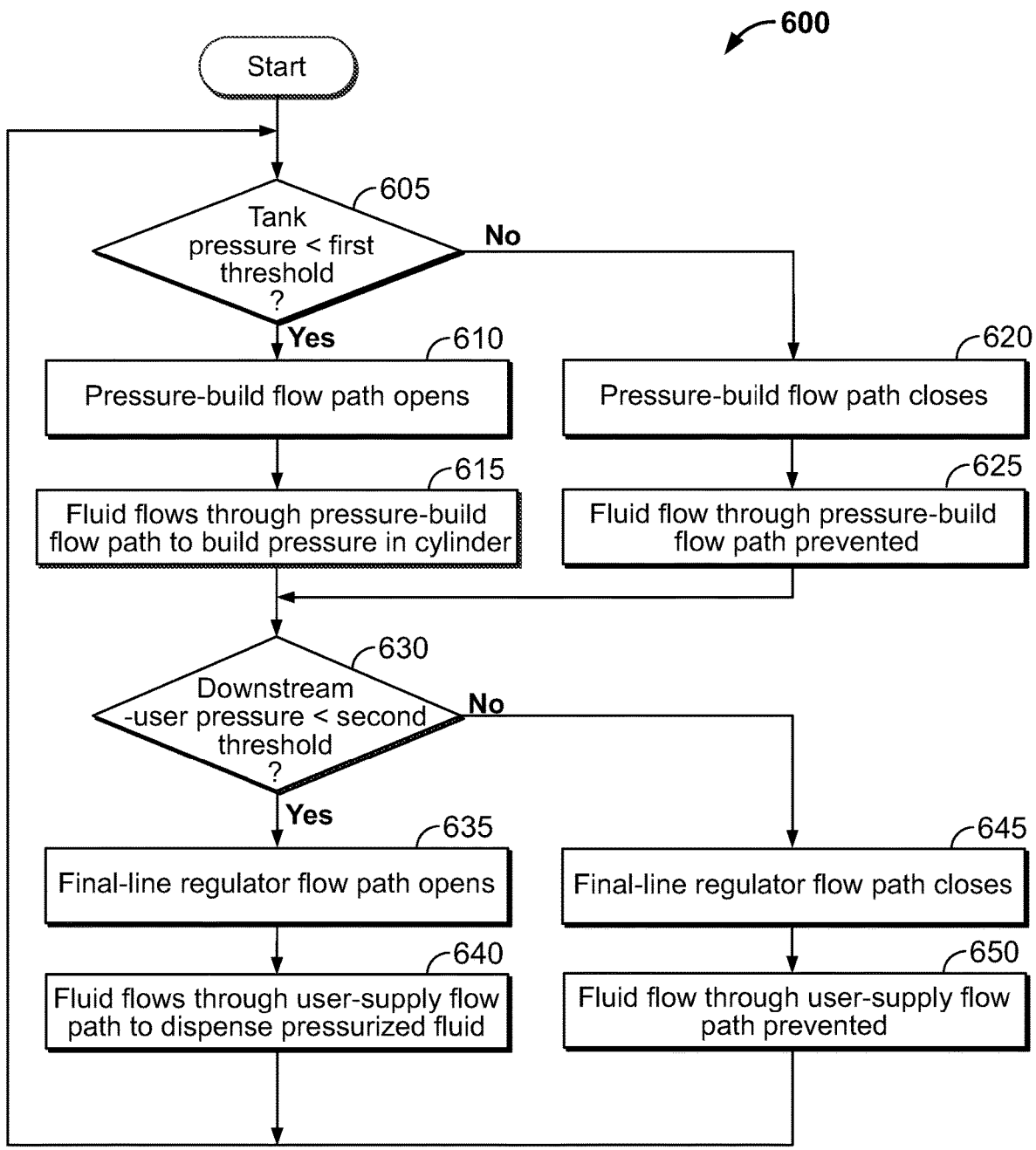
FIG. 11 is a flowchart of a valve operating as a pressure builder and a final-line gas regulator within the system of FIG. 10 in accordance with the teachings herein.

FIG. 11 is a flowchart of an example method 600 of a valve, such as the valve 100 or the valve 1000, operating as a pressure builder and a final-line gas regulator within the system 500. While the example method 600 is described with reference to the flowchart illustrated in FIG. 11, the order of execution of the blocks may be rearranged, changed, eliminated, and/or combined to perform the method 600. Additionally, while the method 600 is disclosed as being performed with the valve 100 and its components, it should be understood that the method 600 can be performed with an other valve, such as the valve 1000, that is configured to operate as both a pressure build operator and a final-line gas regulator.

At block 605, the pressure of fluid within the fluid-pressure chamber 372, which equals the tank pressure within the pressurized tank 510, is compared to a first threshold. For example, the first threshold equals the difference in forces applied by the biasing spring 320 and the return spring 360.

If the tank pressure is less than the first threshold, the piston diaphragm 330 causes a pressure-build flow path between the tank port 210 and the tank port 220 to open at block 610. For example, the piston diaphragm 330 causes the stem 340 to push the plug 350 away from the valve seat 352 to open the pressure-build flow path. At block 615, when the pressure-build flow path is open, the pressurized liquid 512 is vaporized into the pressurized gas 514 as it flows through the pressure-build flow path. Subsequently, the pressurized gas 514 is provided to the pressurized tank 510 to build and maintain the pressure of the pressurized fluid within the pressurized tank 510. That is, operation of the pressure-build regulator of the valve 100 is activated.

If the tank pressure is not less than (i.e., is greater than or equal to) the first threshold, the piston diaphragm 330 causes a pressure-build flow path between the tank port 210 and the tank port 220 to be closed at block 620. For example, the piston diaphragm 330 enables the return spring 360 to push the plug 350 onto the valve seat 352 to close the pressure-build flow path. At block 625, when the pressure-build flow path is closed, fluid flow of the pressurized fluid through the pressure-build flow path is prevented as a result of the piston diaphragm 330 fluidly disconnecting the tank port 220 from the tank port 210. That is, operation of the pressure-build regulator of the valve 100 is deactivated.

Additionally, at block 630, the pressure of fluid within the fluid-pressure chamber 472, which equals the downstream-user pressure of fluid for the pressurized-fluid consuming device 520, is compared to a second threshold. For example, the second threshold equals the difference in forces applied by the biasing spring 420 and the return spring 460.

If the downstream-user pressure is less than the second threshold, the piston diaphragm 430 causes a final-line flow path between the tank port 220 and the outlet port 230 to open at block 635. For example, the piston diaphragm 430 causes the stem 440 to push the plug 450 away from the valve seat 452 to open the final-line flow path. At block 640, when the final-line flow path is open, the pressurized gas 514 flows from the tank port 220, through the final-line flow path, out the outlet port 230, and to the pressurized-fluid consuming device 520. That is, operation of the final-line regulator of the valve 100 is activated.

If the downstream-user pressure is not less than (i.e., is greater than or equal to) the second threshold, the piston diaphragm 430 causes a pressure-build flow path between the tank port 220 and the outlet port 230 to be closed at block 645. For example, the piston diaphragm 430 enables the return spring 460 to push the plug 450 onto the valve seat 452 to close the final-line flow path. At block 650, when the final-line flow path is closed, fluid flow of the pressurized gas 514 through the final-line flow path is prevented as a result of the piston diaphragm 430 fluidly disconnecting the outlet port 230 from the tank port 220. That is, operation of the final-line gas regulator of the valve 100 is deactivated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A valve for providing pressurized fluid to a pressurized-fluid consuming device, comprising:
  a body defining a first tank port and a second tank port configured to fluidly connect to a pressurized tank, an outlet port configured to fluidly connect to the pressurized-fluid consuming device, and a linking chamber fluidly connected to the second tank port;
  a pressure-build assembly comprising:
    a first piston at least partially defining a first fluid-pressure chamber that is fluidly connected to the first tank port; and
    a first plug operatively connected to the first piston, wherein the first fluid-pressure chamber is fluidly connected to the linking chamber when the first plug is in a first open position; and
  a final-line assembly comprising:
    a second piston at least partially defining a second fluid-pressure chamber that is fluidly connected to the outlet port; and
    a second plug operatively connected to the second piston, wherein the second fluid-pressure chamber is fluidly connected to the linking chamber when the second plug is in a second open position.

2. The valve of claim 1, wherein the pressure-build assembly further comprises a first valve seat, wherein the first plug engages the first valve seat in a first closed position and is disengaged from the first valve seat in the first open position.

3. The valve of claim 2, wherein the final-line assembly further comprises a second valve seat, wherein the second plug engages the second valve seat in a second closed position and is disengaged from the second valve seat in the second open position.

4. The valve of claim 1, wherein, to increase a pressure of the pressurized fluid within the pressurized tank:
  the first tank port is fluidly connected to a lower portion of the pressurized tank to receive the pressurized fluid in liquid form; and
  the second tank port is fluidly connected to an upper portion of the pressurized tank to provide the pressurized tank with the pressurized fluid in gas form upon vaporization.

5. The valve of claim 4, wherein the first plug is configured to:
  be in the first open position when the pressure of the pressurized fluid within the first fluid-pressure chamber is less than a first pressure threshold; and
  be in a first closed position to fluidly disconnect the first and second tank ports when the pressure of the pressurized fluid within the first fluid-pressure chamber is greater than or equal to the first pressure threshold.

6. The valve of claim 5, wherein, when the first tank port is fluidly connected to the pressurized tank, the pressure of the pressurized fluid within the first fluid-pressure chamber equals the pressure of the pressurized fluid within the pressurized tank.

7. The valve of claim 4, wherein the second plug is configured to:
  be in the second open position when the pressure of the pressurized fluid within the second fluid-pressure chamber is less than a second pressure threshold; and
  be in a second closed position to limit the pressure of the pressurized fluid that is provided to the pressurized-fluid consuming device by fluidly disconnecting the second tank port and the outlet port when the pressure of the pressurized fluid within the second fluid-pressure chamber is greater than or equal to a first pressure threshold.

8. The valve of claim 7, wherein, when the outlet port is fluidly connected to the pressurized-fluid consuming device, the pressure of the pressurized fluid within the second fluid-pressure chamber equals the pressure of the pressurized fluid within the pressurized-fluid consuming device.

9. The valve of claim 1, further comprising a second outlet port fluidly connected to the second fluid-pressure chamber, wherein the second outlet port is configured to fluidly connect to a pressure sensor.

10. The valve of claim 1, wherein the pressure-build assembly further comprises a first bonnet coupled to the body, and wherein the body and the first bonnet define a first cavity.

11. The valve of claim 10, wherein the first piston is positioned in the first cavity to define the first fluid-pressure chamber and a first spring cavity within the first cavity, wherein the first piston fluidly isolates the first spring cavity from the first fluid-pressure chamber.

12. The valve of claim 11, wherein the pressure-build assembly further comprises a first biasing spring positioned in the first spring cavity, wherein the first biasing spring engages the first piston to bias the first plug toward a first closed position of the first plug.

13. The valve of claim 12, wherein the first biasing spring is configured to cause the first piston to position the first plug in the first closed position when a first force applied by the first biasing spring to a first side of the first piston overcomes a second force applied to an opposing second side of the first piston by fluid pressure of fluid within the first fluid-pressure chamber, and wherein the first piston is configured to position the first plug in the first open position when the second force applied by the fluid pressure of the fluid within the first fluid-pressure chamber overcomes the first force applied by the first biasing spring.

14. The valve of claim 12, wherein the pressure-build assembly further comprises a first return spring operatively connected to the first plug, wherein the first biasing spring is configured to cause the first piston to position the first plug in the first closed position when a first force applied by the first biasing spring to a first side of the first piston is greater than a second force applied to an opposing second side of the first piston by a combination of fluid pressure of fluid within the first fluid-pressure chamber and the first return spring, and wherein the first piston is configured to position the first plug in the first open position when the second force is greater than or equal to the first force.

15. The valve of claim 10, wherein the final-line assembly further comprises a second bonnet coupled to the body, and wherein the body and the second bonnet define a second cavity.

16. The valve of claim 15, wherein the second piston is positioned in the second cavity to define the second fluid-pressure chamber and a second spring cavity within the second cavity, wherein the second piston fluidly isolates the second spring cavity from the second fluid-pressure chamber.

17. The valve of claim 16, wherein the final-line assembly further comprises a second biasing spring positioned in the second spring cavity, wherein the second biasing spring engages the second piston to bias the second plug toward a second closed position of the second plug.

18. The valve of claim 17, wherein the second biasing spring is configured to cause the second piston to position the second plug in the second closed position when a second force applied by the second biasing spring to a first side of the second piston overcomes the second force applied to an opposing second side of the second piston by fluid pressure of fluid within the second fluid-pressure chamber, and wherein the second piston is configured to position the second plug in the second open position when the second force applied by the fluid pressure of the fluid within the second fluid-pressure chamber overcomes a first force applied by the second biasing spring.

19. The valve of claim 17, wherein the final-line assembly further comprises a second return spring operatively connected to the second plug, wherein the second biasing spring is configured to cause the second piston to position the second plug in the second closed position when a first force applied by the second biasing spring to a first side of the second piston is greater than a second force applied to an opposing second side of the second piston by a combination of fluid pressure of fluid within the second fluid-pressure chamber and the second return spring, and wherein the second piston is configured to position the second plug in the second open position when the second force is greater than or equal to the first force.

20. The valve of claim 1, further comprising a spring support fixedly positioned within the linking chamber, wherein the pressure-build assembly further comprises a first return spring that engages the spring support and is operatively connected to the first plug to bias the first plug to a first closed position, and wherein the final-line assembly further comprises a second return spring that engages the spring support and is operatively connected to the second plug to bias the second plug to a second closed position.

21. The valve of claim 20, wherein the spring support is a filter through which the pressurized fluid is to flow in the linking chamber.

* * * * *